(12) United States Patent
Yang et al.

(10) Patent No.: US 6,567,936 B1
(45) Date of Patent: May 20, 2003

(54) DATA CLUSTERING USING ERROR-TOLERANT FREQUENT ITEM SETS

(75) Inventors: Cheng Yang, Mountain View, CA (US); Usama M. Fayyad, Mercer Island, WA (US); Paul S. Bradley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/500,173

(22) Filed: Feb. 8, 2000

(51) Int. Cl.[7] ................................................. G06F 11/00
(52) U.S. Cl. ................................. 714/37; 707/2; 707/3; 707/4; 707/5; 707/6
(58) Field of Search .......................... 714/1, 37; 707/2, 707/3, 4, 5, 6

(56) References Cited

U.S. PATENT DOCUMENTS 5,845,285 A * 12/1998 Klein .......................... 707/101
6,049,797 A *  4/2000 Guha et al. ..................... 707/6
6,490,582 B1 * 12/2002 Fayyad et al. .................. 707/6

OTHER PUBLICATIONS

Cheng Yang, Usama Fayyad, Paul Bradley, Efficient Discovery of Error–Tolerant Frequent Itemsets in High Dimensions, 2001, ACM.*
Roberto J. Bayardo Jr., Rakesh Agrawal, Dimitrios Gunopulos, Constraint–Based Rule Mining in Large, Dense Databases.*
Suh–Ying Wur and Yungho Leu, An Effecitve Boolean Algorithm for Mining Association Rules in Large Databases.*
Hannu Toivonen, Sampling Large Databases for Association Rules, Proceedings of the 22nd VLDB Conference Mumbai (Bombay), India, 1996, pp. 134–145.
Roberto J. Bayardo, Jr., Efficiently Mining Long Patterns from Databases, SIGMOD 98, Seattle, WA, USA, 1998, pp. 85–93.
Usama M. Fayyad, Cory Reina, P.S. Bradley, Initialization of Iterative Refinement Clustering Algorithms, Proceedings of the Fourth International Conference on Knowledge Discovery and Data Mining, AAAI Press, Aug. 1998.
Marina Meila, David Heckerman, An Experimental Comparison of Several Clustering and Initialization Methods, Microsoft Research Technical Report MSR–TR–98–06, Feb. 1998.
Dimitrios Gunopulos, Heikki Mannila, Sanjeev Saluja, Discovering all most specific sentences by randomized algorithms, Proc. Of the 6th Int'l Conf. On Database Theory, pp. 215–229, 1997.
M.J. Zaki, S. Parthasarathy, M. Ogihara, W. Li, New algorithms for fast discovery of association rules, In Proc. of the Third Int'l Conf. On Knowledge Discovery in Databases and Data Mining, pp. 283–286, 1997.

* cited by examiner

Primary Examiner—Robert Beausoliel
Assistant Examiner—Marc M Duncan
(74) Attorney, Agent, or Firm—Watts, Hoffmann, Fisher & Heinke, Co., L.P.A.

(57) ABSTRACT

A generalization of frequent item sets to error-tolerant frequent item sets (ETF) is disclosed, together with its application in data clustering using error-tolerant frequent item sets to either build clusters or as an initialization technique for standard clustering algorithms. Efficient feasible computational algorithms for computing ETF's from very large databases is presented. In one embodiment, a method determines a plurality of weak ETF's, which are strongly tolerant of errors, and determines a plurality of strong ETF's therefrom, which are less tolerant of errors. The resulting clusters can be used as an initial model for a standard clustering approach, or may themselves be used as the end clusters. In one embodiment, the data covered by the strong clusters is removed from the data, and the process is repeated, until no more weak clusters can be found. Te invention includes methods for constructing ETF's from more general data types: data sets that include categorical discrete, continuous, and binary attributes.

54 Claims, 6 Drawing Sheets

FIG 3

| 1 | 2 | 3 | 4 | 5 | 6 | 7 | 8 | 9 | 10 |
|---|---|---|---|---|---|---|---|---|---|
| 1 | 1 | 1 | 1 | 1 |   |   |   |   | 1 |
| 1 | 1 | 1 | 1 |   |   |   | 1 |   |   |
| 1 | 1 | 1 | 1 | 1 |   |   |   |   |   |
| 1 | 1 | 1 | 1 | 1 |   |   |   |   |   |
| 1 | 1 | 1 | 1 | 1 |   |   |   |   |   |
| 1 | 1 | 1 | 1 | 1 |   |   |   |   |   |
| 1 | 1 | 1 | 1 | 1 |   |   |   |   |   |
| 1 | 1 | 1 | 1 |   | 1 | 1 |   | 1 |   |
| 1 | 1 | 1 | 1 | 1 | 1 |   | 1 | 1 |   |
|   |   |   |   |   | 1 | 1 | 1 | 1 |   |
|   |   |   |   |   | 1 | 1 | 1 | 1 |   |
|   |   |   |   |   | 1 | 1 | 1 | 1 |   |
|   |   |   |   |   | 1 | 1 |   | 1 |   |
|   |   |   |   |   |   |   |   | 1 |   |
|   |   |   |   |   | 1 |   |   |   |   |
|   | 1 |   |   |   |   |   |   |   |   |
|   |   |   | 1 |   |   |   | 1 |   |   |
|   |   | 1 |   |   |   |   |   |   |   |
| 1 |   |   |   |   |   |   |   |   | 1 |

FIG 5

| Apple | Orange | Banana | Cola | Milk |
|-------|--------|--------|------|------|
| 1     |        |        |      |      |
| 1     | 1      | 5      | 1    |      |
| 1     | 2      |        |      |      |
| 1     | 1      | 4      | 2    |      |
| 2     | 1      | 2      | 2    |      |
| 3     | 3      | 1      | 2    | 1    |
| 1     | 3      |        |      | 1    |
| 1     | 3      | 3      | 2    |      |
| 1     | 3      |        |      |      |
| 1     | 3      |        |      |      |

FIG 6

| A1 | A2 | A3 | O1 | O2 | O3 | B1 | B2 | B3 | B4 | B5 | C1 | C2 | M1 |
|----|----|----|----|----|----|----|----|----|----|----|----|----|----|
| 1  |    |    |    |    |    |    |    |    |    |    |    |    |    |
| 1  |    |    | 1  |    |    |    |    |    |    |    | 1  | 1  |    |
| 1  |    |    |    | 1  |    |    |    |    |    |    |    |    |    |
| 1  |    |    | 1  |    |    |    |    |    | 1  |    |    | 1  |    |
|    | 1  |    | 1  |    |    |    | 1  |    |    |    |    | 1  |    |
|    |    | 1  |    |    |    | 1  | 1  |    |    |    |    | 1  | 1  |
| 1  |    |    |    | 1  |    |    |    |    |    |    |    |    | 1  |
| 1  |    |    |    | 1  |    |    |    | 1  |    |    |    | 1  |    |
| 1  |    |    |    | 1  |    |    |    |    |    |    |    |    |    |
| 1  |    |    |    | 1  |    |    |    |    |    |    |    |    |    |

DATA CLUSTERING USING ERROR-TOLERANT FREQUENT ITEM SETS

FIELD OF THE INVENTION

This invention relates generally to the clustering of very large data sets, such as transactional, categorical, and binary data, and more particularly to such clustering using error-tolerant frequent item sets.

BACKGROUND OF THE INVENTION

With the advent of the Internet, and especially electronic commerce ("e-commerce") over the Internet, the use of data analysis tools, such as data mining, has increased. In e-commerce and other Internet and non-Internet applications, databases are generated and maintained that have large amounts of information, so that they can be analyzed, or "mined," to learn additional information regarding customers, users, products, etc. That is, data analysis tools provide for leveraging the data already contained in databases to learn new insights regarding the data by uncovering patterns, relationships, or correlations.

A common data analysis operation is data clustering, which is also known within the art as database segmentation or data segmentation. Clustering targets finding groups of records such that members of each cluster are more similar to records within the cluster than they are to records in other clusters. Clustering allows for frequent item sets within the data to be detected once the clusters are discovered. Frequent items sets are sets of items (combinations of attributes of entities or records) that occur with significant frequency in the data, Finding such frequent groups, such as groups of users, groups of purchasers, etc., instead of focusing on just the items themselves (products or web pages) allows for new insights to be obtained from the data. For example, a purchaser who has purchased items X and Y may also be predicted as likely to purchase item Z, based on other purchasers who have purchased items X and Y also having had purchased item Z. Thus, a retailer knowing this information may be compelled directly advertise item Z to this purchaser, or perhaps make a special offer or customized coupon for it, or even discount one of the items and hope to make margin on the other correlated items in the cluster.

Many clustering approaches, such as the Expectation Maximization (EM) or the K-Means approaches known within the art, typically require an initial specification of the full clustering model. The initial specification may be randomly selected or generated by some other means. Once this initial model is specified, the approaches iteratively refine the initial model to maximize the fit of the clustering model to the data. A drawback to such approaches, however, is that the function measuring the fit of the clustering model to the data has many locally optimal solutions that are globally sub-optimal. The clustering approach can only guarantee convergence to a locally optimal solution, and not a globally optimal solution. Hence, many other better solutions may be missed simply because the initial model was not good enough. Thus, the initial model selection plays a large role in determining the quality of the solution obtained.

Usually the number of local solutions is very large when fitting databases of even modest size to a model. Many of the local solutions are often unsatisfactory. For example, when clustering high-dimensional sparse databases—that is, databases where each record (e.g. customer) only specifies values for a very small subset of all possible attributes or items (e.g. products). For example, of 100,000 products available in the store, each customer (record) usually purchases only 5 or 6 items. Another example is web browsing: out of millions of possible pages on the web, a typical user only visits a tiny fraction of them.—In such a situation, there may exist many local clustering solutions that have empty clusters, which are clusters containing no records of data. Another property that makes the clustering problem difficult is skewed distributions over the items (attributes): a predetermined item dominates most items of the databases, such that variance therefrom is infrequent. When the frequency of items drops off geometrically, e.g. frequency of item i is proportional to 1/i, the data is said to obey a Zipf distribution. The Zipf distribution is a skewed distribution and is observed in web-browsing data, product-purchasing data, text-data keyword count data, and many other sparse data bases in practice.

Given the above difficulties, a common approach within the prior art is to search for good clustering solutions by re-running the clustering approach from many different random initial cluster models, in the hope of finding a good solution. However, there are no guarantees, nor probabilistic arguments, that a good clustering solution will be found without employing methods exponential in running time. These methods are infeasible to apply to large databases. Even re-running the clustering approach from many different initial cluster models is computationally prohibitive for large-scale databases. For example, given a database of even modest size, the time required for running a clustering approach from a single initial clustering model can take hours or even days. Applying the approach from many different randomly selected initial clustering models can thus take many days. And again, there is no guarantee that a good solution will be found.

For this and other reasons, therefore, there is a need for the present invention.

SUMMARY OF THE INVENTION

The invention relates to data clustering using error-tolerant frequent item sets (denoted as ETF's). In one embodiment, a method first determines a plurality of weak error-tolerant frequent item sets, which are strongly tolerant of errors, and then determines a plurality of strong error-tolerant frequent item sets (ETF's) therefrom, which are less tolerant of errors. The resulting error-tolerant frequent item sets can be used as an initial model for a standard clustering approach such as the EM approach, or may themselves be used as the end clusters. Furthermore, in one embodiment, the data covered by the strong ETF's is removed from the data, and the process is repeated, until no more weak ETF's can be found therein. The data can be binary, categorical, or continuous data.

Embodiments of the invention provide for advantages not found within the prior art. Traditional frequent item sets are defined to be exact: they are supported only by the data records that have all the items appearing in the frequent item set. Efficient algorithms for discovering frequent item sets rely on this definition. The definition of frequent item sets is generalized herein to Error-Tolerant Frequent Item sets (ETF) and an efficient algorithm is provided for computing them over very large databases. Relaxing the error tolerance of ETF's has been determined not only to lead to more general summaries of the data than traditional frequent item sets, but also to lead to initial clustering solutions that are much better than known methods for selecting initial clustering solutions. This in turn dramatically reduces the computational resources necessary to obtain improved clustering solutions. Furthermore, the chance of converging to a clustering solution with empty clusters has been found to be significantly reduced—an important problem to avoid, while measures quantifying the fit of the clustering model to the data have been found to be maximized.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 3 is a table of data showing a weak and a strong ETF's therein, according to an embodiment of the invention;

FIG. 5 is a table of categorical discrete data in conjunction with which embodiments of the invention may be practiced; and, FIG. 6 is a table of binary data that is the result of transformation of the categorical discrete data of FIG. 5 thereto, in accordance with an embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
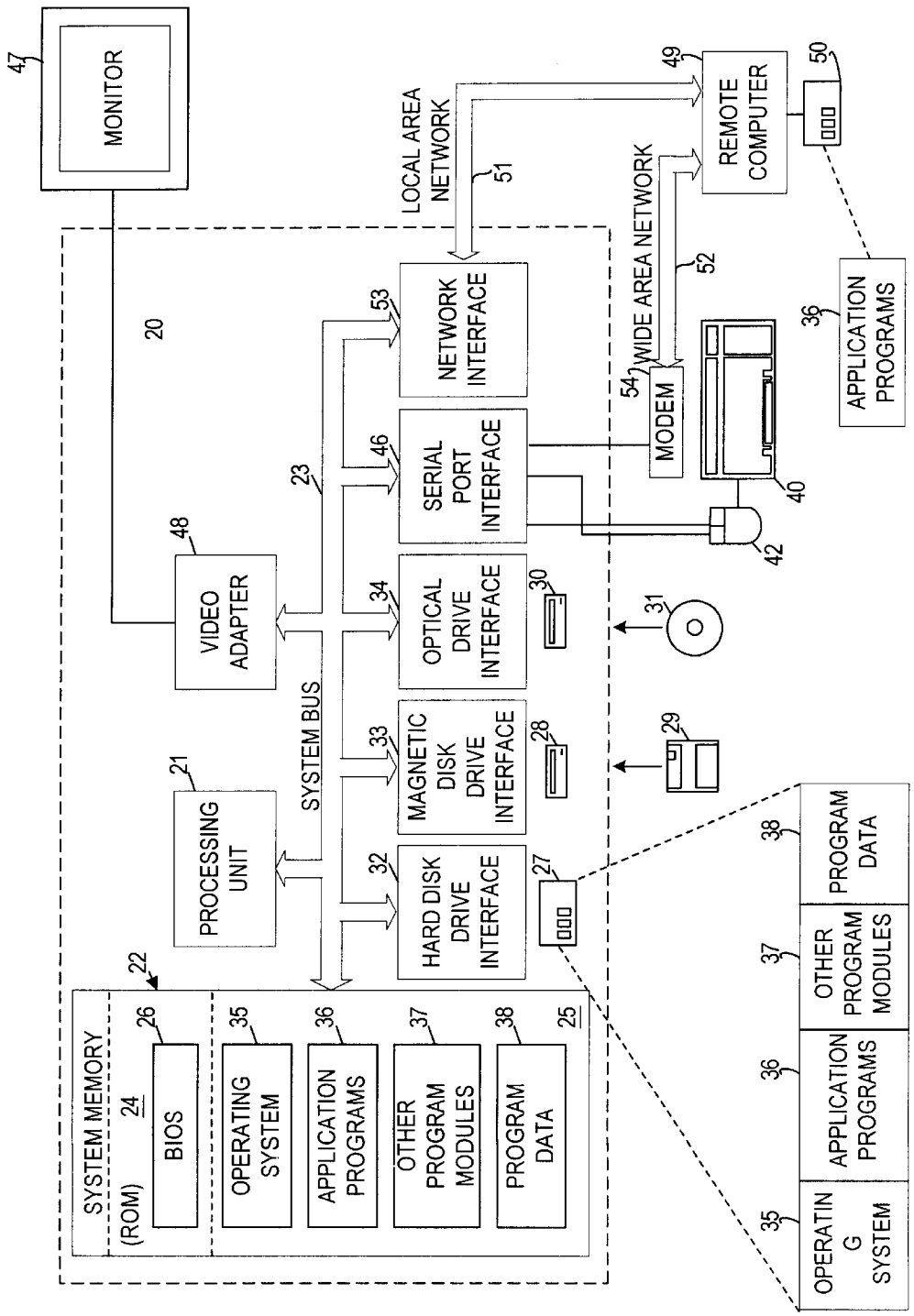
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

(Transactional or Sparse) Binary Data

In this section of the detailed description, transactional (sparse) binary data is described, in conjunction with which embodiments of the invention may be practiced. It is noted, however, that the invention is not limited to application to transactional binary data. In other embodiments, categorical discrete data, and continuous data, are amenable to embodiments of the invention, as is described in a later section of the detailed description.

Figure 2:
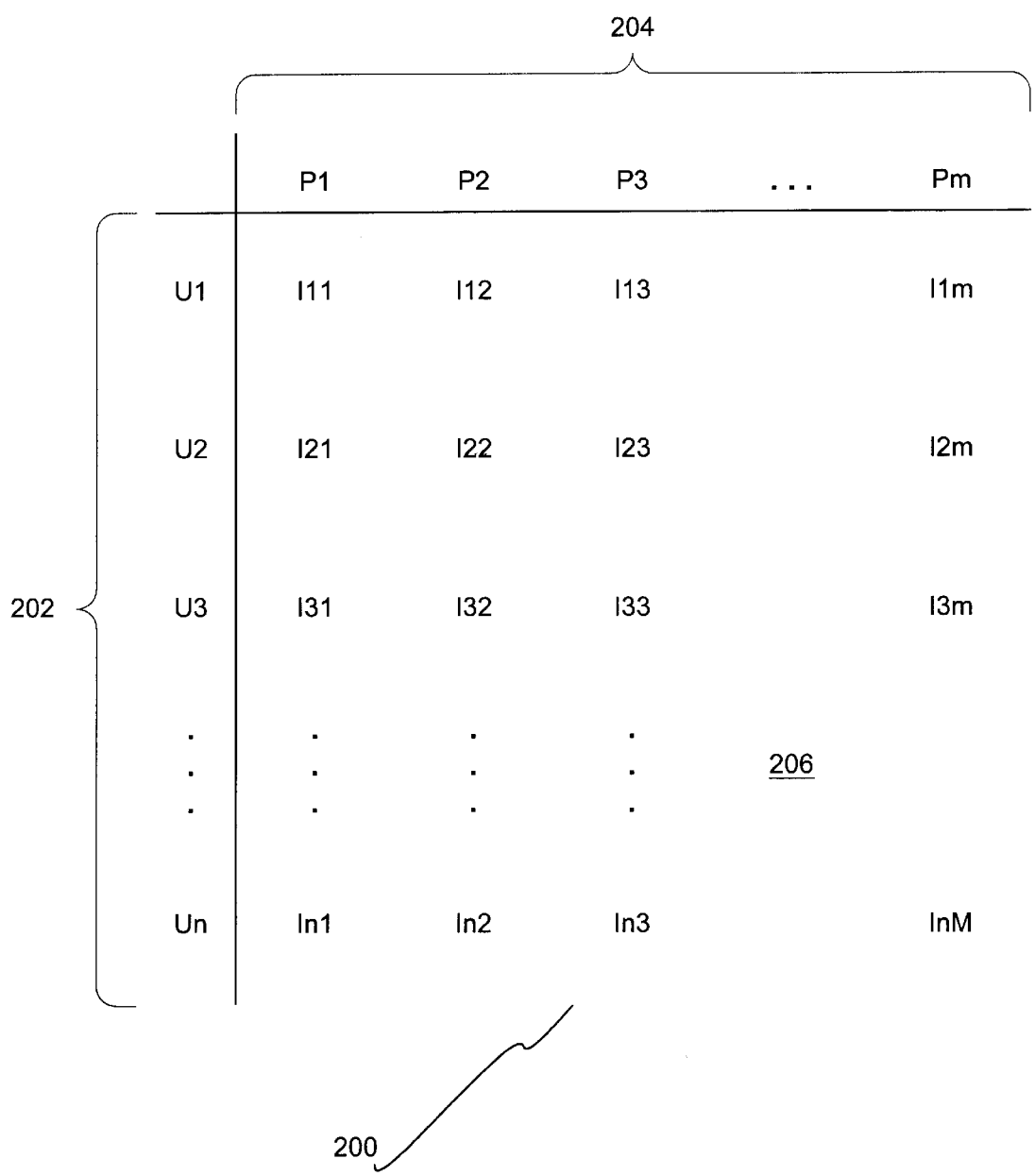
FIG. 2 is a diagram showing a representative set of binary transactional data in conjunction with which embodiments of the invention can be practiced.

Referring to FIG. 2, a diagram of transactional binary data in conjunction with which embodiments of the invention may be practiced is shown. The data 206 is organized in a chart 200, with rows 202 and columns 204. Each row, also referred to as a record, in the example of diagram of FIG. 2 corresponds to a user, such as users 1 . . . n. In general, the term user, entity, row, or records is used to represent a collection of transactions pertaining to a single entity. These could be products bought by a shopper, in which case the record consists of the collection of all products purchased by a particular shopper. In general the semantics of a row in the binary data table need not be that of users. Each column is referred to as a dimension. In the example of FIG. 2, each column corresponds to a product, such as products 1 . . . m. But, in general the semantics of a column in the binary table need not be that of products. Each entry within the data 206, also referred to as each item within the data 206, corresponds to whether the user has purchased the particular product, and is a binary value, where 1 corresponds to the user having purchased the particular product, and 0 corresponds to the user not having purchased the particular product. Thus, I23 corresponds to whether user 2 has purchased product 3, In2 corresponds to whether user n has purchased item 2, I1m corresponds to whether user 1 has purchased item m, and Inm corresponds to whether user n has purchased item m.

The data 206 is referred to as sparse, because most items have the value 0, indicating the fact that for any particular user, the user has likely not purchased a given product in the example. The data 206 is binary in that each item can have either the value 0 or the value 1. The data 206 is transactional in that the data was acquired by logging transactions of users' purchasing activity over a given period of time. It is noted that the particular correspondence of the rows 202 to users, and of the columns 204 to products, is for representative example purposes only, and does not represent a limitation on the invention itself. For example, the columns 204 in other embodiment could represent web in pages that the users have viewed. In general, the rows 202 and the columns 204 can refer to any type of features. The columns 204 are interchangeably referred to herein as dimensions. Furthermore, it is noted that in large databases, the values n for the number of rows 202 can be quite large, approaching hundreds of thousands to tens of millions or more. And m for the number of columns 204 can be quite large, approaching the tens and the hundreds of thousands, if not more.

A cluster over the data 206 is defined generally as a set of dimensions, referred to as the defining dimensions, where a predetermined value, such as 1 or 0, appears with high probability over a subset of the records (rows). Typically the "distinguished value" is '1'. Determining the clusters for the data 206 is referred to as clustering of the data 206, or segmentation of the data 206. Where n and m are large, utilizing prior art clustering techniques generally results in finding many empty clusters—that is, clusters that have no data records (equivalently, rows of the data table) associated with them. A phenomenon equivalent to finding empty clusters is to have some clusters converge on identical or near-identical centroids (parameters). In this case, none of the clusters may seem empty, but in effect they are redundant. Furthermore, prior art clustering techniques generally are time-intensive, and can take hours to days to run for a large data set. Embodiments of the invention relate to finding clusters in significantly less time, with significantly greater opportunity of finding non-empty clusters that are different from each other. Embodiments of the invention can be used as an initial input to prior art clustering techniques, or can be used on their own to find clusters within data. A cluster is also referred to herein as a frequent item set, which are items within the data 206 that frequently occur together within a transaction.

Prior art definitions of a "cluster" typically include a summary of the data records belonging to the cluster (i.e. the "members" of the cluster) and a criterion used to assign data records to a cluster. In typical clustering algorithms, the membership is one cluster per record. Probabilistic approaches to clustering require a statistical model of the data associated with each cluster. In this invention, the concept of error-tolerant frequent item sets (ETF) is used to summarize the members of a cluster. Specifically, the ETF represents the following cluster summary: the records belonging to a cluster defined by an ETF having defining dimensions DD have (approximately) the same attribute values over the defining dimensions DD. The ETF says nothing about non-defining dimensions, in contrast to usual clustering methodologies where a cluster specifies a complete distribution on all dimensions. Even distance-based clustering methods, such as K-means, base the distance on all dimensions. ETF's are defined and described by their defining dimensions only. They also admit overlap between clusters. The criteria used to assign a data record to a cluster is based on observing the attribute values for the data record over DD and if these values are "similar" to the ETF, then the record is a member of the cluster defined by the ETF (specific embodiments of this membership criteria are given below).

Let I be the set of all items. Before defining the error tolerant frequent item set, $\epsilon$ is defined as a value between 0 and 1, representing the allowable error. Furthermore, $\kappa$ is defined as a value between 0 and 1 that denotes the proportion of data records that "support" an ETF. An error-tolerant frequent itemset (ETF) is defined as follows: an item set $E \subseteq I$ is an error-tolerant item set having error $\epsilon$ and support $\kappa$ with respect to a database D having n transactions if there exists at least $\kappa \cdot n$ transactions in which the probability of observing a 1 (the "distinguished value" that indicates an event occurred) over the item set is not less than $1-\epsilon$. Note that even though the definition only references the defining dimensions (in contrast to clustering which usually refers to all dimensions), it can be viewed as defining a group of records that contain a "vertical" slice that satisfies the definition of the ETF. Note that ETF existence is not tied to a specific set of records (as is the case for frequent item sets), but rather as long as enough records exist to satisfy the requirement. Hence the support set is not necessarily unique for ETF's, in contrast to traditional Frequent Item sets methods. By defining a membership function to go along with a set of ETF's, clusters can be based on ETF's.

When attempting to cluster large binary-valued databases, prior art techniques are often plagued by finding many empty clusters (clusters having no members) and clusters which are the same (2 or more clusters have near-identical parameters, hence describe the same set of records) and are redundant. Embodiments of the invention can be used as an initial input to prior art clustering techniques, or can be used on their own to find clusters within data. The methods of this invention help prior art clustering ethods reach better solutions when initialized using the methods presented in this invention.

Weak and Strong Error-Tolerant Frequent Item Sets (ETF's)

In this section of the detailed description, weak and strong ETF's, as these terms are used herein, are described. In general, embodiments of the invention introduce error-tolerant frequent item sets—that is, ETF's—which are collections of data columns that are more tolerant of errors therewithin as compared to standard frequent item sets as typically known within the art. From a mathematical perspective, an error-tolerant item set $E \subseteq I$ is defined as having error $\epsilon$ (value between 0 and 1) and support $\kappa$ (value between 0 and 1) with respect to a database D having n transactions if there exists at least $\kappa \cdot n$ transactions in which the probability of observing a 1 (the "distinguished value") over the item set is not less than $1-\epsilon$. In particular, two types of error-tolerant frequent item sets are utilized, referred to as weak and strong ETF's. Standard frequent item sets can be viewed as a special case of the ETF generalization presented in this invention. They represent the special case when $\epsilon=0$.

A weak ETF is strongly tolerant of errors therein. More specifically, in one embodiment of the invention, a weak ETF is defined as a set of records R and a set of defining dimensions DD, such that R contains at least a predetermined number of records, referred to as minSupport number of records (e.g. minSupport=$\kappa \cdot n$), where the fraction values not equal to the predetermined or distinguished value (i.e. errors), over the set of records R over the identified defining dimensions DD is not greater than a predetermined percentage, referred to as maxError (e.g. maxError=$\epsilon$) (equivalently, the fraction of values equal to the predetermined or distinguished value (i.e. non-errors), over the set of records R over the defining dimensions DD is not less than 1−maxError). In other words, a weak ETF includes a set of records and a set of defining dimensions such that at least a predetermined minimum number threshold of records (minSupport) is included within the set of records, and a fraction of errors (values not equal to the predetermined or distinguished value (either 0 or 1)) occurring over the set of records over the set of defining dimensions is not greater than a predetermined maximum error threshold (maxError). From a mathematical perspective, a weak ETF is defined as a set of items, called defining dimensions $DD \subseteq I$, such that there exists a subset of transactions $R \subseteq T$, $|R| \geq \kappa \cdot n$ transactions and, $$\frac{\sum_{x \in R} \sum_{d \in DD} d(x)}{|R| \cdot |DD|} \geq (1-\varepsilon).$$

Here the value of d(x) is "1" when dimension (column) d of record (row) x is equal to the predetermined or distinguished value of interest. A strong ETF is weakly tolerant of errors therein. More specifically, in one embodiment of the invention, a strong ETF is defined as a set of records R and a set of defining dimensions DD, such that R contains at least a predetermined number of records, referred to as minSupport number of records, where, for each of these records, the fraction of errors (values not equal to the predetermined or distinguished value), over the defining dimensions DD is not greater than a predetermined error percentage, referred to as maxError. In other words, a strong cluster includes a set of records and a set of defining dimensions such that at least a predetermined minimum number threshold of records (minSupport) is included within the set of records, and a fraction of errors for each record over the set of defining dimensions is not greater than a predetermined maximum error threshold (maxError). From a mathematical perspective, a strong ETF is defined as a set of items, called defining dimensions DD⊆I, such that there exists a subset of transactions R⊆T consisting of at least κ·n transactions and, for each of r∈R, the fraction of items in DD which are present (value for items in DD having the predetermined or distinguished value) in r is at least 1−ϵ.

The predetermined or distinguished value as used in the above definitions is typically 1 (a value that indicated that an event occurred as opposed to not occurred—e.g. 1 might indicates a customer bought a product, while 0 or NULL indicates she has not). That is, the data set is typically sparse such that most of the items are typically 0. Therefore, it is noted that the weak definition requires that a sub-matrix within a data set, where the sub-matrix is defined by the records in R and the columns in DD, be mostly 1's, with the fraction of 0's not greater than MaxError. For the strong definition, each record within R must be mostly 1's, with the fraction of 0's (over the defining dimensions) not greater than MaxError. Thus, a strong ETF satisfies the weak definition, but not vice-versa. In one embodiment, for both weak and strong ETF's, the set DD is referred to as defining the ETF, where minSupport is referred to as the support threshold, and MaxError the error threshold. Furthermore, a set of defining dimensions DD is referred to as maximal if and only if DD defines an ETF and no superset of DD defines an ETF.

An example is illustrative in showing the definitions of weak and strong ETF's. Referring to the table of FIG. 3, where the support threshold is 25% and the error threshold is 20%, the columns [1 2 3 4 5] are a strong ETF, particularly a maximal strong ETF; the columns [1 2 3 4] are also a strong ETF, but a non-maximal strong ETF, since the columns [1 2 3 4 5] are a superset of the columns [1 2 3 4]; and, the columns [6 7 8 9] are a weak ETF, particularly a maximal weak ETF, but are not a strong ETF.

As is described in the next section of the detailed description, embodiments of the invention find strong ETF's within data sets. These strong ETF's can be used as the initial starting point for prior art clustering techniques to further refine them, or, they can be used as the clusters of the data set themselves. The weak ETF's are particularly used to assist in finding strong ETF's.

Finding ETF's According to Varying Embodiments of the Invention

Figure 4:
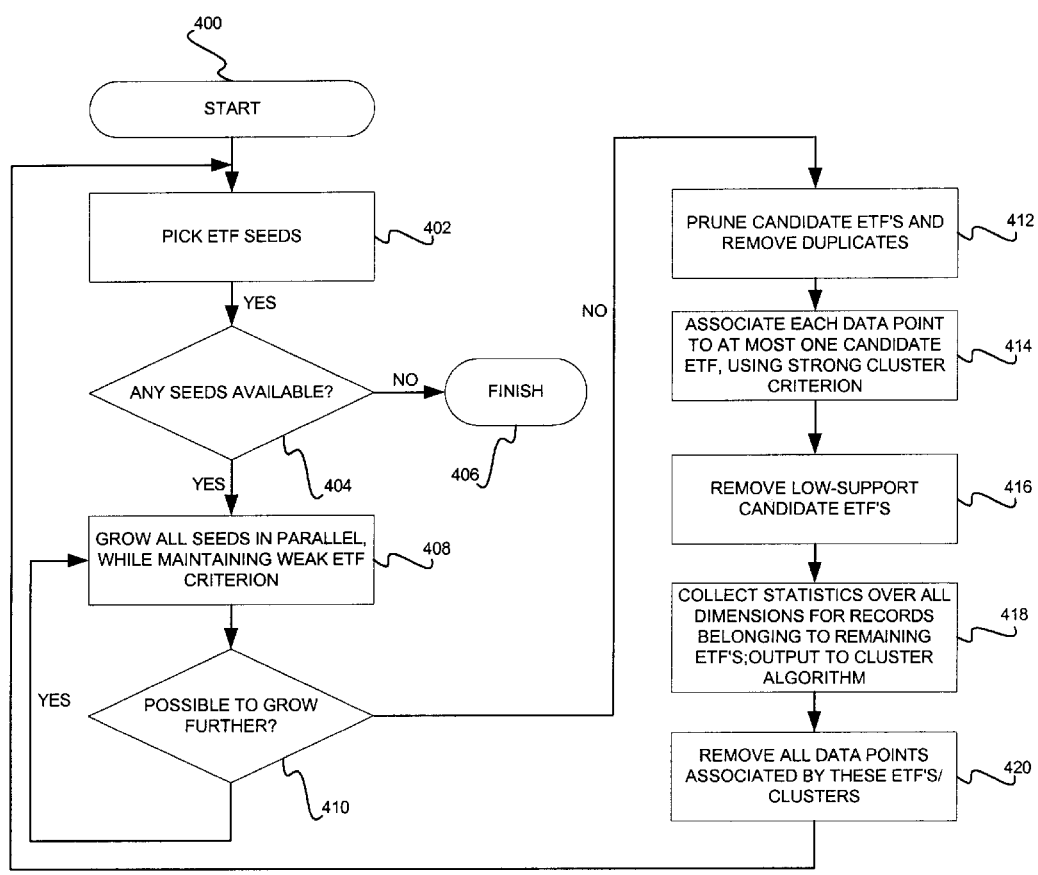
FIG. 4 is a flowchart of approaches to find weak and strong clusters within data of a database, according to varying embodiments of the invention.

In this section of the detailed description, manners by which ETF's are found according to varying embodiments of the invention are described. The description is made in conjunction with the flowchart of FIG. 4. In particular, 400, 402, 404, 406, 408, 410, 412, 414, and 416 represent a first approach to find ETF's, according to an embodiment of the invention. 418 added to the first approach represents a second approach to find ETF's, according to an embodiment of the invention. 420 added to the second approach represents a third approach to find ETF's, according to an embodiment of the invention. The flowchart of FIG. 4 is now described in detail.

From the starting point in 400, the method proceeds to 402, where ETF seeds are selected, or picked. In particular, a data set is scanned, and all dimensions where the number of occurrences of 1's is at least minSupport times (1−maxError) are selected. At this stage, dimensions are considered that have a global count of "1" near minSupport by a margin defined by the amount of error that will be tolerated (i.e. 1−maxError). These dimensions are referred to as high support dimensions, and their indices are stored in an array referred to as highSupport. Each high support column is treated as a set to be grown into a potential cluster. Another array, referred to as candidate ETF's, is created to track the ETF's being grown. Each of its elements is a list of dimensions representing a ETF that has been grown so far, initialized to the seeds. From a mathematical perspective, 402 can be described as finding all dimensions $d_i$ where the global count of 1's is at least $\kappa n(1-\epsilon)$. The term $\kappa n$ denotes minSupport, n is the total number of rows in the data table and $\epsilon$ is the tolerated maxError. Each of these dimensions forms a singleton set $\{d_i\}$ which defines a weak ETF; each of these singleton sets is referred to as a seed. A counter i is set to 1.

If there are no such weak ETF seeds, then the method proceeds from 404 to 406, where it is finished. Otherwise, the method proceeds from 404 to 408, where all the seeds are grown into weak ETF's in parallel. That is, the seeds are grown while maintaining the definition of a weak ETF's. In one embodiment, the ETF's are grown as is now described. For each element c in candidate ETF's, the following approach is used to grow the element by one dimension:

```
for each i in highSupport that is not included in c
    if (c + {i}) satisfies the weak ETF definition and
        probability of "0"s along dimension i in the
corresponding weak ETF is at most maxError
                            // this test can be done in
                            one
                            // pass
    then
        identify i as a candidate dimension
        δ_i := the error rate of this corresponding weak
        ETF
    if the set of candidate dimensions is nonempty
    then
        among all candidate dimensions, pick the dimension
        j that minimizes the weak ETF error rate. (In case
        of a tie, pick the one with higher support.)
        c := c + {j}              // grow the ETF by one
        dimension
```

It is noted that this approach only requires one pass over the data.

That is, given a set of m candidate dimensions, their eligibility to be defining dimensions for a weak ETF's can be tested with one pass over the data. While scanning the data, m+1 counters $C_0, C_1, \ldots, C_m$ are maintained, where $C_i$ keeps track of the number of records that have i "1"s out of m candidate dimensions, i=0,1,2, . . . , m. From these counters, the maximum t is found such that $$\sum_{i=t}^{m} C_i \geq \kappa \cdot n,$$

where n is the total number of records in the database. With this t value, let $$C'_t = \sum_{i=t}^{m} C_i - \kappa \cdot n.$$

Define $$\delta = \frac{\left(\sum_{i=t+1}^{m} (m-i)C_i\right) + (m-t)(C_t - C'_t)}{\kappa \cdot n \cdot m}.$$

Then, the m candidate dimensions are eligible to be defining dimensions for a weak ETF if and only if $\delta \leq \epsilon$, and $\delta$ is referred to as the error rate of this weak ETF.

The above algorithm is actually doing the following: it ranks all rows based on the number of "1"s out of m candidate dimensions, picks the top κn rows, and checks the probability δ of "0"s occurring among the κn rows over m candidate dimensions. Such ranking ensures that, if we picked any other set of κn rows, the probability of "0"s occurring among those rows over m candidate dimensions would be at least as big as δ. Therefore, if δ>ε, no weak ETF exists. If δ≦ε, these κn rows and m dimensions form a weak ETF, so a weak ETF exists.

It is noted that the probability of "0"s along a particular dimension d within the weak ETF may also be desired to be known. To do this, the above approach is augmented by keeping an extra set of m+1 counters $Z_0, Z_1, \ldots, Z_m$, where $Z_1$ keeps track of how many 0's there are in this particular dimension d, over those data points that have i 1's out of m candidate dimensions. These counters, together with the other counters $C_0, C_1, \ldots, C_m$, can be updated in the same pass over the database. Then, the probability of 0's along dimension d within the weak ETF is approximately the fraction:

$$\frac{\left(\sum_{i=t+1}^{m} Z_i\right) + \max(0, Z_t - C'_t)}{\kappa \cdot n}.$$

Thus, in 408, for every seed that contains i dimensions, it is grown by adding a dimension to it so that the new seed still defines a weak ETF. If one or more such dimensions can be found, only one of them is kept. If the weak ETF's cannot be grown further, then the method proceeds from 410 to 412. Otherwise, 408 is repeated, incrementing i by 1, until the weak ETF's cannot be grown further.

In 412, the candidate (weak) ETF's are pruned, and duplicates are removed. Duplicate ETF's can exist because the ETF's are grown from different seeds, such that two ETF's may ultimately grow to the same candidate ETF. In one embodiment, the candidate ETF's are pruned, and duplicates are removed, according to the following approach:

```
for each c in candidateETF's
    for each defining dimension i of c
        for each defining dimension j of c
            if ( i ≠ j )
            then
                s := chi-square statistic for dimensions i
                and j over the entire dataset
                K_ij := √s/N where N is the total number of
                records in the dataset
        if ( average of K_ij over j (for j ≠ i ) is
        smaller than 0.01)
        then
            remove dimension i from the candidate ETP c
look for duplicate ETF's in candidateETF's (i.e.,
those whose defining dimensions are exactly the same),
and remove duplicates, keeping only one copy of each
unique candidate ETF's.
```

As used in the above approach, the chi-square statistic in one embodiment is the following:

let $p_{00}$ = # of records where dimension i is 0 and dimension j is 0
$p_{01}$ = # of records where dimension i is 0 and dimension j is 1
$p_{10}$ = # of records where dimension i is 1 and dimension j is 0
$p_{11}$ = # of records where dimension i is 1 and dimension j is 1
$I_0$ = # of records where dimension i is 0 ( = $p_{00}$ + p01 )
$I_1$ = # of records where dimension i is 1 ( = $p_{10}$ + $p_{11}$ )
$J_0$ = # of records where dimension j is 0 ( = $p_{00}$ + $p_{10}$ )
$J_1$ = # of records where dimension j is 1 ( = $p_{01}$ + $p_{11}$)
N = total # of records in the dataset ( = $p_{00}$ + $p_{01}$ + $p_{10}$ + $p_{11}$ )
$e_{00}$ = $I_0 J_0/N$
$e_{01}$ = $I_0 J_1/N$
$e_{10}$ = $I_1 J_0/N$
$e_{11}$ = $I_1 J_1/N$
then the chi-square statistic is defined by $$\sum_{m=0}^{1} \sum_{n=0}^{1} \frac{(P_{mn} - e_{mn})^2}{e_{mn}}$$

Thus, 400, 402, 404, 406, 408, 410 and 412 of FIG. 4 are used to determine the weak ETF's among the data of a database, where the weak ETF's are strongly tolerant of errors. Specifically, in 402, ETF seeds—single dimensions within the data—are selected, and in 408 and 410, they are each grown into a weak ETF. The ETF seeds are such that each includes at least a predetermined number of records—minSupport—of the data of the database that has a value of 1 (the predetermined or distinguished value) for that dimension. The seeds are grown into weak ETF's dimension by dimension, such that a dimension is added to a seed if it satisfies a predetermined criterion for weak ETF's; that is, if adding the dimension to the seed maintains a weak ETF. Thus, the weak ETF criterion is in one embodiment whether the fraction of 0's occur for the dimension to be added that is not greater than the maximum error threshold. The pruning in 412 then prunes the high-support ETF's from the weak ETF's that have been grown which have random dimensions (discovered, for instance if the Chi-Squared statistic has a rather small value).

Next, in 414 and 416, the strong ETF's are obtained from the weak ETF's. First, in 414, each record within the data set, also referred to as each data point, is associated with at most one candidate (weak) ETF's, using a strong ETF criterion. This can be accomplished in one embodiment by:

```
for each data point p in the dataset
    for each c in candidateETF's
        M_c := # of defining dimensions in c where p
has a 1
        // call this "matching accuracy"
        if some M_c is at least 1-maxError
    then
        associate p with the candidate ETF c with
the
        largest M_c
        (in case of a tie, choose the ETF c with
more
        defining dimensions)
    else
        associate p with no candidate ETF
```

Next, in 416, the ETF's associated with fewer than minSupport records are removed. In other words, only those ETF's that are strong ETF's remain after 414 and 416, and more specifically, only the maximal strong ETF's.

Thus, 414 and 416 are used to determine the strong ETF's among the data of a database from the weak ETF's, where the strong ETF's are weakly (less) tolerant of errors as compared to the weak ETF's. This is accomplished in 414 and 416 first by setting the strong ETF's to the weak ETF's (that is, the strong ETF's will be determined from the weak ETF's, and thus are a priori set to the weak ETF's before determining them), assigning each record of the data of the database to no more than one of the strong ETF's upon determining that the record satisfies a predetermined criterion for strong ETF's (in 414), and then removing low-support ETF's (in 416). The predetermined criterion in one embodiment is whether the fraction of 0's occurring for the record over a set of defining dimensions is not greater than a predetermined maximum error threshold.

The resulting strong ETF's can in one embodiment be deemed as the clusters of the database. However, in another embodiment, further processing is performed.

Specifically, in 418 statistics are collected over all dimensions over the records associated with the strong ETF's that have been determined through 416, and these ETF's are used as an initial model for a traditional clustering technique that is known within the art—for example, the Expectation Maximization (EM) approach known within the art. The resulting ETF's from 418 can then also be deemed in this embodiment as the clusters of the database. Thus, in 418, the strong ETF's as determined through 416 are refined using a different clustering approach, such as EM. In one embodiment, where the EM approach is used as the different clustering approach, statistics are collected as follows:

--- for each c in "candidateETF's"
    collect the following statistics from the set S
(the set of data supporting c)
        points that have been associated with c:
        for each dimension d in the dataset
            $p_d$ := probability of observing a 1 in S along
            dimension d
        output the vector $p_d$ (for all d) as one cluster
for the
    initial model
mark all data points in S

---

In still another embodiment, further processing is performed to obtained the clusters of the database. Specifically, in 420, all records—that is, all data points—covered by the clusters determined through 418 are removed from the database. The method then proceeds back to 402, to select new ETF seeds from the remaining data, and the method continues until in some iteration no more seeds are available, in which case the method ends at 406. That is, the method is repeated until one additional weak ETF seed cannot be found. The removal in 420 of records is accomplished by concluding that a record is covered by a (strong) ETF upon determining that a fraction of 0's occurring for the record over the set of defining dimensions is not greater than the predetermined maximum error threshold.

In another embodiment, the strong ETF's computed by the method are kept as clusters and the set of data points not covered by any of these strong ETF's are then separately clustered into K groups in a standard fashion. The final clustering of the database is obtained by merging the cluster descriptions from the strong ETF's and the clusters found by a standard clustering algorithm applied to data not fitting the strong ETF's.

It is noted that methods according to varying embodiments of the invention can be constructed by performing one or more of 400, 402, 404, 406, 408, 410, 412, 414, 416, 418 and 420 of FIG. 4. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

The approach described in this section of the detailed description for determining the clusters of data of a database has been found to be much quicker than prior art clustering approaches, and, furthermore, has been found to result in non-empty cluster sets significantly more than prior art approaches result in such non-empty clusters. As has already been described, embodiments of the invention are not limited to any particular type of data on which the clustering approaches thereof are used. In some embodiments, the clustering approach is useful for applications including data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in electronic commerce.

Embodiments of the invention are also amenable to changes to the basic approach described in conjunction with FIG. 4 in this section of the detailed description. For example, in one modification, 414 and 416 of FIG. 4 are modified such that each data point is associated with more than one ETF candidate. A data point can be "split" and a fraction of that data point is assigned to each of the matching candidate ETF's. Splitting can happen either by: (1) splitting equally among matching ETF's; or, (2) assigning more weight to ETF's that match more (e.g., weights proportional to the number of matching dimensions, or assign weights inversely proportional to the number of violating dimensions). A dimension is matching if the data point has the dimension appearing in it and in the ETF. A dimension is violating if it appears in the ETF but not in the data point, or vice versa. As another example, in another modification, 402 of FIG. 4 is modified such that, instead of treating each high-support dimension as a seed, each high-support dimension pair (i.e. two dimensions where the number of occurrences of two 1's is at least minSupport) is treated as an initial seed.

Non-Binary Data Sets

As described in the preceding sections of the detailed description, the approach used to find ETF's is applicable to data sets that are binary. In this section of the detailed description, the manner by which non-binary data sets can be converted to binary data sets for use with embodiments of the invention is described. Specifically, non-binary data sets that can be converted include categorical discrete data sets, and continuous data sets.

A data set can be thought of as containing attributes (items, or dimensions) $d_1, d_2, \ldots, d_m$, where attribute $d_i$ takes values from the domain $\{NULL, v_{i1}, v_{i2}, \ldots, v_{it_i}\}$. Thus, binary attributes can be thought of as taking values from the domain $\{NULL, 1\}$. As before, sparse datasets are emphasized, where most of the entries have NULL values. Let I be the set of all attributes, and T be the set of all transactions in the dataset. Let n be the total number of transactions. Given support threshold $\kappa$ and error threshold $\epsilon$, Error-Tolerant Frequent Item Sets (ETF's) for binary data is defined in the preceding sections of the detailed description as follows. A strong ETF includes a set of items, called defining dimensions DD⊆I, such that there exists a subset of transactions R⊆T consisting of at least κ·n transactions and, for each of r∈R, the fraction of items in DD which are present (have the predetermined or distinguished value) in r is at least 1−ϵ.

For categorical data, conversely, strong ETF's are specifically divided into three classes. A class-1 strong ETF includes a set of (attribute, value) pairs, such that there exists a subset of transactions R⊆T consisting of at least κ·n transactions and, for each of r∈R, the fraction of these (attribute, value) pairs that are present in r is at least 1−ϵ. A class-2 strong ETF includes a set of (attribute, value range) pairs, such that there exists a subset of transactions R⊆T consisting of at least κ·n transactions and, for each of r∈R, the fraction of these (attribute, value range) pairs that are represented in r is at least 1−ϵ. A "value range" is an interval of attribute values. An (attribute, value range) pair is represented in r if and only if r contains an entry for the given attribute, whose value falls into the given value range. This definition is applicable only to data sets having attribute values can be ordered so that "value range" can be defined. A class-3 strong ETF consists of a set of (attribute, value set) pairs, such that there exists a subset of transactions R⊆T consisting of at least κ·n transactions and, for each of r∈R, the fraction of these (attribute, value set) pairs that are represented in r is at least 1−ϵ. A "value set" is a set of attribute values. An (attribute, value set) pair is represented in r if and only if r contains an entry for the given attribute, whose value falls into the given value set. Hereafter, a class-n ETF refers to either a class-1, class-2, or class-3 strong ETF (i.e., where n equals 1, 2, or 3).

An example is shown in the table of FIG. 5. With κ=40% and ϵ=0%, {(Apple, 1), (Orange, 3)} is a class-1 strong ETF. {(Apple, [1 . . . 2]), (Banana, [2 . . . 5])} is a class-2 strong ETF. {(Banana, [1,2,4,5]), (Cola, [1,2])} is a class-3 strong ETF.

Therefore, in one embodiment, to find ETF's in a categorical data set, the data set is transformed into a binary one and the approach described in preceding sections of the detailed description for finding ETF's is then performed on it. In particular, three different kinds of transformations from categorical data to binary data are presented, in order to accommodate the three ETF definitions above. It is assumed that each attribute $d_i$ has domain {NULL, $v_{i1}, v_{i2}, \ldots, v_{it_i}$}. The values corresponding to $v_{ij}$ do not need to be counts (i.e. discrete and ordered), but can be strictly unordered such as "brown", "black" and "blonde" for an attribute "hair color". Note that in this case, discovery of Class-1 ETF's (attribute-value pairs) and Class-3 ETF's (attribute-{values set} pairs) can be accomplished since neither of these assumes an ordering over the values {NULL, $v_{i1}, v_{i2}, \ldots, v_{it_i}$}. For Class-2 ETF's, an ordering must be assumed over the values {NULL, $v_{i1}, v_{i2}, \ldots, v_{it_i}$}. Class-2 ETF's can be discovered over count-values and continuous values that have been discretized.

What is referred to as a plain transformation is performed to find Class-1 ETF's. Each old attribute $d_i$ with domain {NULL, $v_{i1}, v_{i2}, \ldots, v_{it_i}$} is transformed into $t_i$ new binary attributes $D_{i1}, D_{i2}, \ldots, D_{it_i}$, each with domain {NULL, 1}. For each row in the data, the new attribute $D_{ij}$ is set to 1 if and only if the old attribute $d_i$ has value $v_{ij}$. For the example table of FIG. 5, the data set after the transformation is shown in the table of FIG. 6, where "A", "O", "B", "C" and "M" stand for "Apple", "Orange", "Banana", "Cola" and "Milk", respectively.

What is referred to as an interval transformation is performed to find Class-2 ETF's. For each old attribute $d_i$ with domain { NULL, $v_{i1}, v_{i2}, \ldots, v_{it_i}$} and for every possible interval [$v_{ij} \ldots v_{ik}$], create a new binary attribute with domain {NULL, 1}. For each row in the data, the new attribute is set to 1 if and only if the corresponding old attribute has value that falls into the corresponding interval. For the example table of FIG. 5, the dataset after transformation has the following 31 binary attributes: Apple 1, Apple 2, Apple 3, Apple 1 . . . 2, Apple 2 . . . 3, Apple 1 . . . 3, Orange 1, Orange 2, Orange 3, Orange 1 . . . 2, Orange 2 . . . 3, Orange 1 . . . 3, Banana 1, Banana 2, Banana 3, Banana 4, Banana 5, Banana 1 . . . 2, Banana 2 . . . 3, Banana 3 . . . 4, Banana 4 . . . 5, Banana 1 . . . 3, Banana 2 . . . 4, Banana 3 . . . 5, Banana 1 . . . 4, Banana 2 . . . 5, Banana 1 . . . 5, Cola 1, Cola 2, Cola 1 . . . 2, Milk 1.

Finally, what is referred to as a subset transformation is performed to find Class-3 ETF's. For each old attribute $d_i$ with domain {NULL, $v_{i1}, v_{i2}, \ldots, v_{it_i}$} and for every non-empty subset of {$v_{i1}, v_{i2}, \ldots, v_{it_i}$}, create a new binary attribute with domain {NULL, 1}. For each row in the data, the new attribute is set to 1 if and only if the corresponding old attribute has value that falls into the corresponding subset. For the example table of FIG. 5, the dataset after transformation has a total of 49 binary attributes: 7 attributes for Apple, 7 attributes for Orange, 31 attributes for Banana, 3 attributes for Cola and 1 attribute for Milk. The ETF-finding approach of embodiments of the invention as described in the preceding sections of the detailed description will then produce error-tolerant frequent item sets of classes 1–3 as have been defined herein. That is, either class-1, class-2 or class-3 ETF's can be set as the "strong ETF's" that are found by the approach that has previously been described. That is, the previous definition for strong ETF's can be substituted by the definition for one of class-1, class-2, or class-3 ETF's, to find either the class-1, class-2, or class-3 ETF's within the data.

For continuous data, the data is mapped to discrete/ordered data by application of one of a number of discretization approaches known within the art. For instance, consider the continuous-valued attribute "Salary" with minimum value 10 K and maximum value 200 K. Suppose there are 3 people in a database of 5000 employees, where person 1 has a salary of 15 K, person 2 has a salary of 22 K, and person 3 has a salary of 121 K. A discretization routine can then be applied to this attribute, such that the output may be that the range 10 K to 200 K is segmented as follows: [10 K, 21 K], [22 K, 50 K], [51 K, 143 K], [144 K, 200 K]. Then the Salary values for the 3 people above are mapped to: person 1 having Salary in [10 K, 21 K], person 2 having Salary in [22 K, 50 K], and person 3 having salary-in [51 K, 143 K]. In general, the number of intervals for the discretization approach to find (and the algorithm finds good ranges) can be specified, or in another embodiment, the method can determine a best number of intervals and ranges.

Still using the salary example, once this discretization has been performed, Salary now has 4 possible values which are ordered: [10 K, 21 K], [22 K, 50 K], [51 K, 143 K], [144 K, 200 K]. In addition, it is supposed that the majority of the people in the database have salary in the range [10 K, 21 K], such that this range can be referred to as "NULL," such that Class-1 ETF's, or Class-2 ETF's, or Class-3 ETF's over this data, as has been described. Thus, for continuous data sets, the data is divided into ranges so that it becomes, in effect, categorical discrete data, which can then be transformed into binary data, as has already been described.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method for clustering a database of data organized into records and dimensions comprising:

determining a plurality of weak ETF's among the data of the database, the weak ETF's tolerant of errors therein; and, determining a plurality of strong ETF's among the plurality of weak ETF's, the strong ETF's less tolerant of errors therein as compared to the weak ETF's.

2. The method of claim 1, wherein the data of the database comprises at least one of transactional and binary data.

3. The method of claim 1, wherein the data comprises non-binary data, and the method initially comprises transforming the non-binary data into binary data.

4. The method of claim 3, wherein the data comprises categorical discrete data.

5. The method of claim 3, wherein the data comprises continuous data.

6. The method of claim 1, wherein each weak ETF comprises a set of records and a set of defining dimensions such that at least a predetermined minimum number threshold of records is included within the set of records, and a fraction of values unequal to a predetermined value occurring over the set of records over the set of defining dimensions is not greater than a predetermined maximum error threshold.

7. The method of claim 6, wherein the data of the database comprises binary data, and the predetermined value comprises one of zero and one.

8. The method of claim 1, wherein each strong ETF comprises a set of records and a set of defining dimensions such that at least a predetermined minimum number threshold of records is included within the set of records, and a fraction of values unequal to a predetermined value occurring for each record over the set of defining dimensions is not greater than a predetermined maximum error threshold.

9. The method of claim 8, wherein the data of the database comprises binary data, and the predetermined value is one of zero or one.

10. The method of claim 1, wherein determining a plurality of weak ETF's comprises:

selecting at least one ETF seed; and, growing each ETF seed into a weak ETF.

11. The method of claim 10, wherein each ETF seed comprises a single dimension of the data of the database.

12. The method of claim 10, wherein selecting at least one ETF seed comprises selecting each dimension of the data of the database where at least a predetermined number of records of the data of the database has a predetermined value for the dimension.

13. The method of claim 12, wherein the data of the database comprises binary data, and the predetermined value comprises one of zero and one.

14. The method of claim 10, wherein growing each cluster seed into a weak ETF comprises adding at least one dimension to the ETF seed upon determining that at least one dimension satisfies a predetermined criterion for weak ETF's.

15. The method of claim 14, wherein the predetermined criterion comprises whether a fraction of values unequal to a predetermined value occurring for the dimension is not greater than a predetermined maximum error threshold.

16. The method of claim 15, wherein the data of the database comprises binary data, and the predetermined value comprises one of zero and one.

17. The method of claim 10, wherein determining a plurality of weak ETF's further comprises pruning high-support ETF's from the plurality of weak ETF's having random dimensions.

18. The method of claim 10, wherein determining a plurality of weak ETF's further comprises removing duplicate ETF's from the plurality of weak ETF's.

19. The method of claim 1, wherein determining a plurality of strong ETF's comprises:

initially setting the plurality of strong ETF's as the plurality of weak ETF's;

for each record of the data of the database, assigning the record to one of the plurality of strong ETF's upon determining that the record satisfies a predetermined criterion for strong ETF's; and, removing low-support ETF's from the plurality of strong ETF's.

20. The method of claim 19, wherein the predetermined criterion comprises whether a fraction of values unequal to a predetermined value occurring for the record over a set of defining dimensions is not greater than a predetermined maximum error threshold.

21. The method of claim 20, wherein the data of the database comprises binary data, and the predetermined value comprises one of zero and one.

22. The method of claim 1, further comprising:

removing from the data of the database each record that is determined to be covered by the plurality of strong ETF's; and, repeating, unless at least one additional weak ETF cannot be determined.

23. The method of claim 22, wherein removing comprises concluding that a record is covered by the plurality of strong ETF's upon determining that a fraction of values unequal to a predetermined value occurring for the record over a set of defining dimensions is not greater than a predetermined maximum error threshold.

24. The method of claim 23, wherein the data of the database comprises binary data, and the predetermined value comprises one of zero and one.

25. The method of claim 22, further comprising, prior to repeating, refining the plurality of strong ETF's using a different clustering approach.

26. The method of claim 25, wherein the different clustering approach comprises Expectation Maximization (EM) clustering.

27. The method of claim 1, further comprising:

removing from the data of the database each record that is determined to be covered by the plurality of strong ETF's;

determining a plurality of clusters via a different clustering approach on the data of the database remaining; and, merging the plurality of strong ETF's with the plurality of clusters to yield clusters over the data of the database.

28. A computer-implemented method for clustering a database of data organized into records and dimensions comprising:

selecting as a cluster seed each dimension that satisfies a predetermined weak criterion;

growing each cluster seed into a cluster using the predetermined weak criterion; and, for a resulting plurality of clusters, assigning each record to one of the resulting plurality of clusters upon determining that the record satisfies a predetermined strong criterion.

29. The method of claim 28, further comprising subsequent to growing each cluster seed into a cluster and prior to assigning each record to one of the resulting plurality of clusters, pruning high-support clusters from the clusters grown from cluster seeds that have random distributions; and, removing duplicate clusters from the clusters grown from cluster seeds as they are pruned.

30. The method of claim 28, further comprising removing low-support clusters from the resulting plurality of clusters as the records have been assigned thereto.

31. The method of claim 28, further comprising:

for a second resulting plurality of clusters, removing from the data of the database each record that is determined to be covered by the second resulting plurality of clusters; and, repeating, unless at least one new cluster seed cannot be determined.

32. The method of claim 28, further comprising, for a second resulting plurality of clusters, refining the second resulting plurality of clusters using a different clustering approach initialized with the clusters determined by strong ETF's.

33. The method of claim 28, wherein the predetermined weak criterion comprises a fraction of values unequal to a predetermined value occurring over the records is not greater than a predetermined maximum error threshold.

34. The method of claim 28, wherein the predetermined strong criterion comprises a fraction of values unequal to a predetermined value occurring for each record over a set of defining dimensions is not greater than a predetermined maximum error threshold.

35. The method of claim 28, wherein the data of the database comprises at least one of transactional and binary data.

36. The method of claim 28, wherein the data comprises non-binary data, and the method initially comprises transforming the non-binary data into binary data.

37. The method of claim 36, wherein the data comprises categorical discrete data.

38. The method of claim 36, wherein the data comprises continuous data.

39. A machine-readable medium having instructions stored thereon for execution by a processor to perform a method for clustering a database reducible to binary data organized into records and dimensions comprising:

determining a plurality of weak clusters among the data of the database, each weak cluster comprising a set of records and a set of defining dimensions such that at least a predetermined minimum number threshold of records is included within the set of records, and a fraction of values unequal to a predetermined value occurring over the set of records over the set of defining dimensions is not greater than a predetermined maximum error threshold; and, determining a plurality of strong clusters among the plurality of weak clusters, each strong cluster comprising a set of records and a set of defining dimensions such that at least a predetermined minimum number threshold of records is included within the set of records, and a fraction of values unequal to a predetermined value occurring for each record over the set of defining dimensions is not greater than a predetermined maximum error threshold.

40. The medium of claim 39, wherein determining a plurality of weak clusters comprises:

selecting as a cluster seed each dimension where at least a predetermined number of records of the data of the database has a predetermined value for the dimension;

growing each cluster seed into a weak cluster by adding at least one dimension to the cluster seed upon determining that each of the at least one dimension satisfies a predetermined criterion for weak clusters;

pruning high-support clusters from the plurality of weak clusters having random dimensions; and, removing duplicate clusters from the plurality of weak clusters.

41. The medium of claim 40, wherein the predetermined criterion comprises whether a fraction of values unequal to a predetermined value occurring for the dimension is not greater than a predetermined maximum error threshold.

42. The medium of claim 39, wherein determining a plurality of strong clusters comprises:

initially setting the plurality of strong clusters as the plurality of weak clusters;

for each record of the data of the database, assigning the record to one of the plurality of strong clusters upon determining that the record satisfies a predetermined criterion for strong clusters; and, removing low-support clusters from the plurality of strong clusters.

43. The medium of claim 39, wherein the predetermined criterion comprises whether a fraction of values unequal to a predetermined value occurring for the record over a set of defining dimensions is not greater than a predetermined maximum error threshold.

44. The medium of claim 39, wherein the method further comprises removing from the data of the database each record for which a fraction of values unequal to a predetermined value occurring for the record over a set of defining dimensions is not greater than a predetermined maximum error threshold; and, repeating, unless at least one additional weak cluster cannot be determined.

45. The medium of claim 44, wherein the method further comprises, prior to repeating, refining the plurality of strong clusters using a different clustering approach.

46. The medium of claim 39, wherein the data comprises non-binary data, and the method initially comprises transforming the non-binary data into binary data.

47. A machine-readable medium having instructions stored thereon for execution by a processor to perform a method for clustering a database of data organized into records and dimensions comprising:

selecting as a cluster seed each dimension that satisfies a predetermined weak criterion;

growing each cluster seed into a cluster using the predetermined weak criterion;

pruning high-support clusters from the clusters grown from cluster seeds that have random distributions;

removing duplicate clusters from the clusters grown from cluster seeds as pruned;

for a resulting plurality of clusters, assigning each record to one of the resulting plurality of clusters upon determining that the record satisfies a predetermined strong criterion; and, removing low-support clusters from the resulting plurality of clusters as the records have been assigned thereto.

48. The medium of claim 47, wherein the predetermined weak criterion comprises a fraction of values unequal to a predetermined value occurring over the records is not greater than a predetermined maximum error threshold.

49. The medium of claim 47, wherein the predetermined strong criterion comprises a fraction of values unequal to a predetermined value occurring for each record over a set of defining dimensions is not greater than a predetermined maximum error threshold.

50. The medium of claim 47, wherein the data of the database comprises at least one of transactional and binary data.

51. The medium of claim 47, wherein the method further comprises:

for a second resulting plurality of clusters, removing from the data of the database each record that is determined to be covered by the second resulting plurality of clusters; and, repeating, unless at least one new cluster seed cannot be determined.

52. The medium of claim 47, wherein the method further comprises, for a second resulting plurality of clusters, refining the second resulting plurality of clusters using a different clustering approach.

53. The medium of claim 47, wherein the data comprises non-binary data, and the method initially comprises transforming the non-binary data into binary data.

54. The medium of claim 53, wherein the resulting strong ETF's are used as initial cluster descriptions to initialize a clustering algorithm such that further iteration refines the clusters.

* * * * *